US012585761B2

(12) United States Patent
Varnavas et al.

(10) Patent No.: US 12,585,761 B2
(45) Date of Patent: Mar. 24, 2026

(54) SYSTEM AND METHOD FOR COMBINING CYBER-SECURITY THREAT DETECTIONS AND ADMINISTRATOR FEEDBACK

(71) Applicant: CITRIX SYSTEMS, INC., Ft. Lauderdale, FL (US)

(72) Inventors: Andreas Varnavas, Achaia (GR); Asterios Stergioudis, Chalkidiki (GR); Nikolaos Georgakopoulos, Athens (GR)

( * ) Notice: Subject to any disclaimer, the term of this patent is extended or adjusted under 35 U.S.C. 154(b) by 541 days.

(21) Appl. No.: 18/049,909

(22) Filed: Oct. 26, 2022

(65) Prior Publication Data

US 2024/0004995 A1 Jan. 4, 2024

Related U.S. Application Data

(63) Continuation of application No. PCT/GR2022/000050, filed on Sep. 27, 2022, which is a continuation-in-part of application No. 17/868,378, filed on Jul. 19, 2022, which is a continuation of application No. PCT/GR2022/000033, filed on Jun. 30, 2022.

(51) Int. Cl.
G06F 21/55 (2013.01)
G06N 7/01 (2023.01)

(52) U.S. Cl.
CPC ............. *G06F 21/554* (2013.01); *G06N 7/01* (2023.01); *G06F 2201/81* (2013.01)

(58) Field of Classification Search
None
See application file for complete search history.

(56) References Cited

U.S. PATENT DOCUMENTS

| | | | | |
|---|---|---|---|---|
| 6,907,430 B2 * | 6/2005 | Chong | ................ | H04L 63/1408 |
| 2003/0070003 A1 * | 4/2003 | Chong | ................ | H04L 63/1408 |
| | | | | 719/330 |
| 2008/0271143 A1 * | 10/2008 | Stephens | ............. | H04L 63/1425 |
| | | | | 726/22 |

(Continued)

OTHER PUBLICATIONS https://pyagrum.readthedocs.io/en/1.0.0/ "Introduction to pyAgrum" as printed from the website on Jul. 19, 2022 (4pages).

(Continued)

*Primary Examiner* — Kaveh Abrishamkar

(57) ABSTRACT

A computer system is provided. The computer system includes a memory and at least one processor coupled to the memory and configured to detect triggering of one or more threat detectors and activate a subset of nodes associated with the triggered threat detectors from a plurality of nodes in a Bayesian network in response to the detection. The at least one processor is further configured to determine that feedback associated with the triggered threat detectors is available and, if so, accumulate the feedback to a feedback node of the network, the feedback node associated with the triggered threat detectors. The at least one processor is further configured to calculate a probability of malicious action using the network to combine probabilities associated with the activated subset of nodes and the feedback node, determine that the probability exceeds a threshold value, and perform a security action in response to the determination.

21 Claims, 17 Drawing Sheets

(56) References Cited

U.S. PATENT DOCUMENTS

| | | | |
|---|---|---|---|
| 2015/0286819 A1* | 10/2015 | Coden ................... | G06F 21/554 |
| | | | 726/23 |
| 2017/0109222 A1* | 4/2017 | Singh .................. | G06F 11/0751 |
| 2019/0163900 A1* | 5/2019 | Zhang .................... | G06N 20/00 |
| 2021/0273959 A1* | 9/2021 | Salji ......................... | G06N 7/01 |

OTHER PUBLICATIONS

Hubbard, D. W., & Seiersen, R. "How to measure anything in Cybersecurity Risk" (2016) (p. 178).

* cited by examiner

Threat Detection Implementation 100

User 105a

Device 110a
OS 115a
Threat Detectors 120

User 105n

Device 110n
OS 115n
Threat Detectors 130

Network 140
Threat Detectors 150

Analytics Server 160
Threat Detector Integration System 170

Other Servers 180

Internet 190

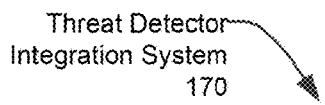
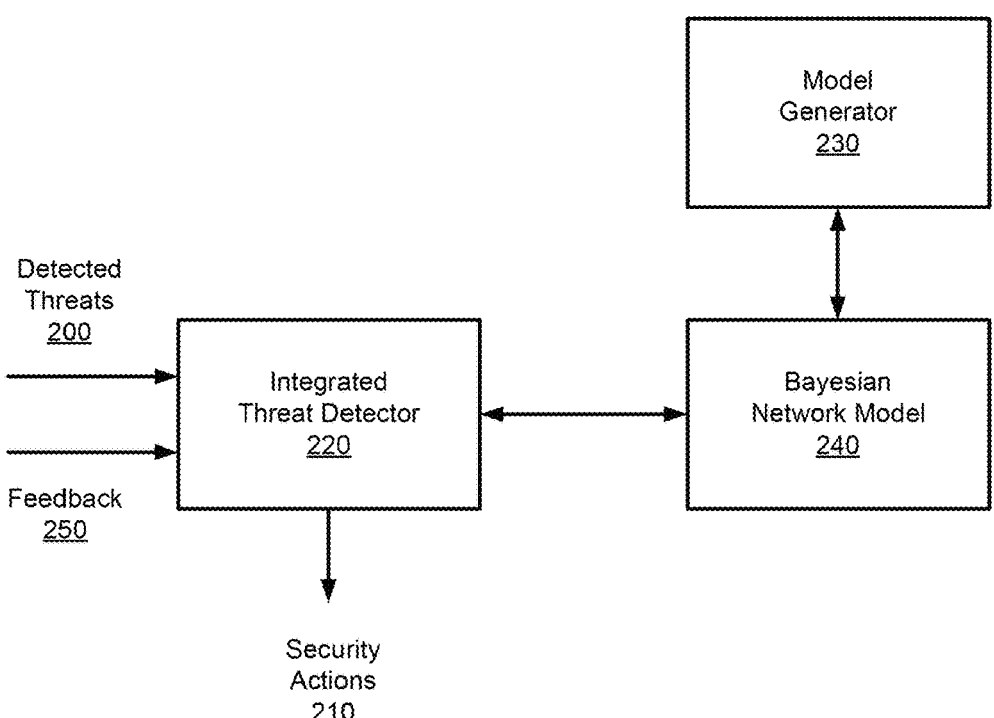
FIG. 2

Model Generator
230

User Property
Detectors
400

, Attack
Objectives
405

, TDGs
410

Bayesian Network
Architecture
Instantiator
420

Bayesian Network
Architecture
425

Expert
Knowledge
430

, Attack
Techniques
435

, Normal
Traffic
440

Conditional
Probabilities
Calculator
450

CPTs
455

Detection
Thresholds
Calculator
460

Thresholds
465

Bayesian
Network Model
240

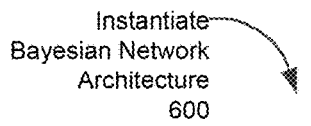
Instantiate
Bayesian Network
Architecture
600
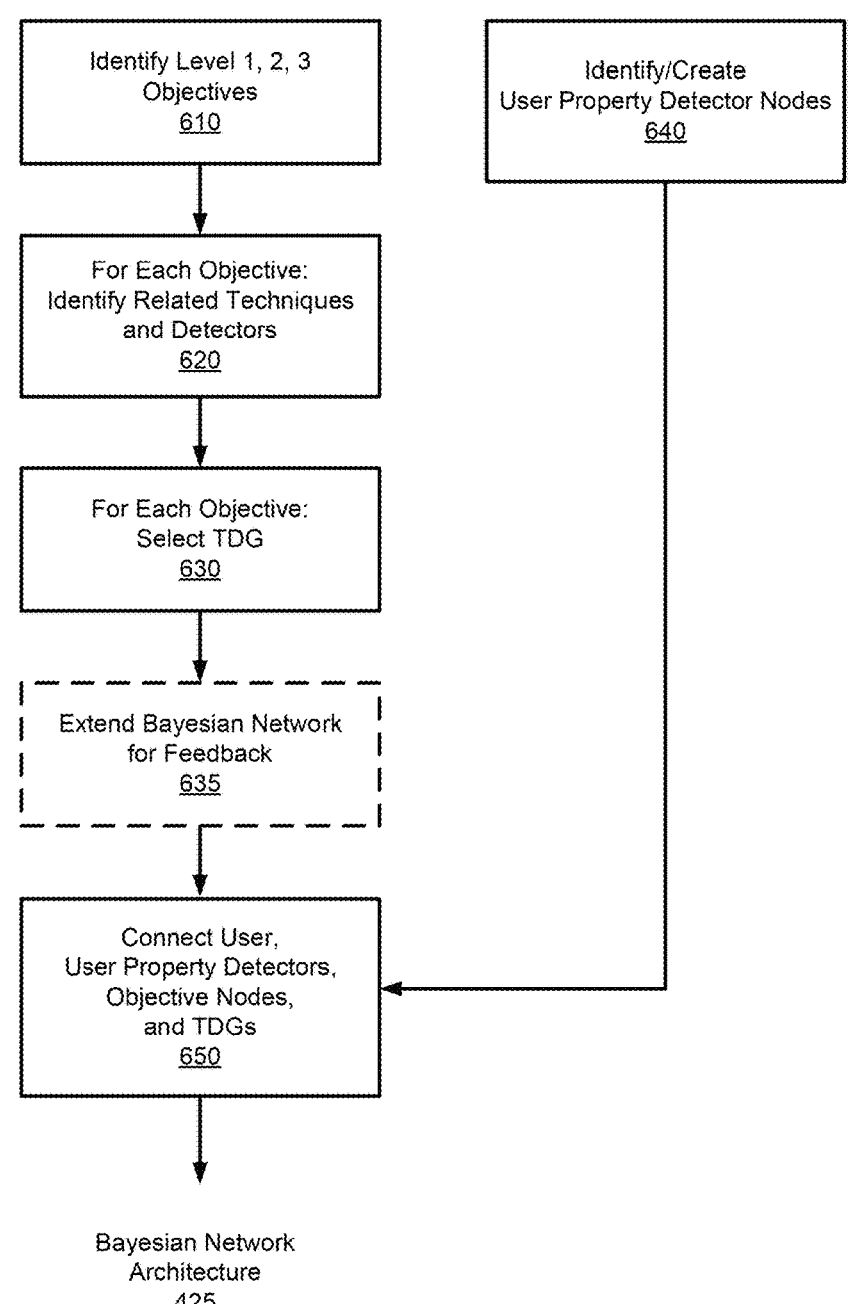
Identify Level 1, 2, 3
Objectives
610
Identify/Create
User Property Detector Nodes
640
For Each Objective:
Identify Related Techniques
and Detectors
620
For Each Objective:
Select TDG
630
Extend Bayesian Network
for Feedback
635
Connect User,
User Property Detectors,
Objective Nodes,
and TDGs
650
Bayesian Network
Architecture
425
FIG. 6

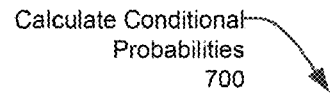

Calculate Conditional
Probabilities
700

For Each Objective:
Estimate P(appearing)
Given Parent Objectives
710

For Each Technique:
Estimate P(appearing)
Given Parent Nodes
730

Calculate Sensitivity of
Detectors
770

Estimate
P(# appearing techniques)
Given Objective Success
740

Calculate Specificity of
Detectors
780

Populate CPTs
of Objective Nodes
720

Populate CPTs of
Techniques and
# of Appearing
Techniques in TDGs
750

Populate CPTs
of Detector Nodes
790

Reassessment?
795

Yes

No

Reassessment?
760

Yes

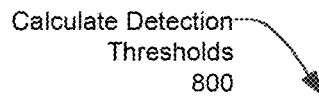
Calculate Detection
Thresholds
800
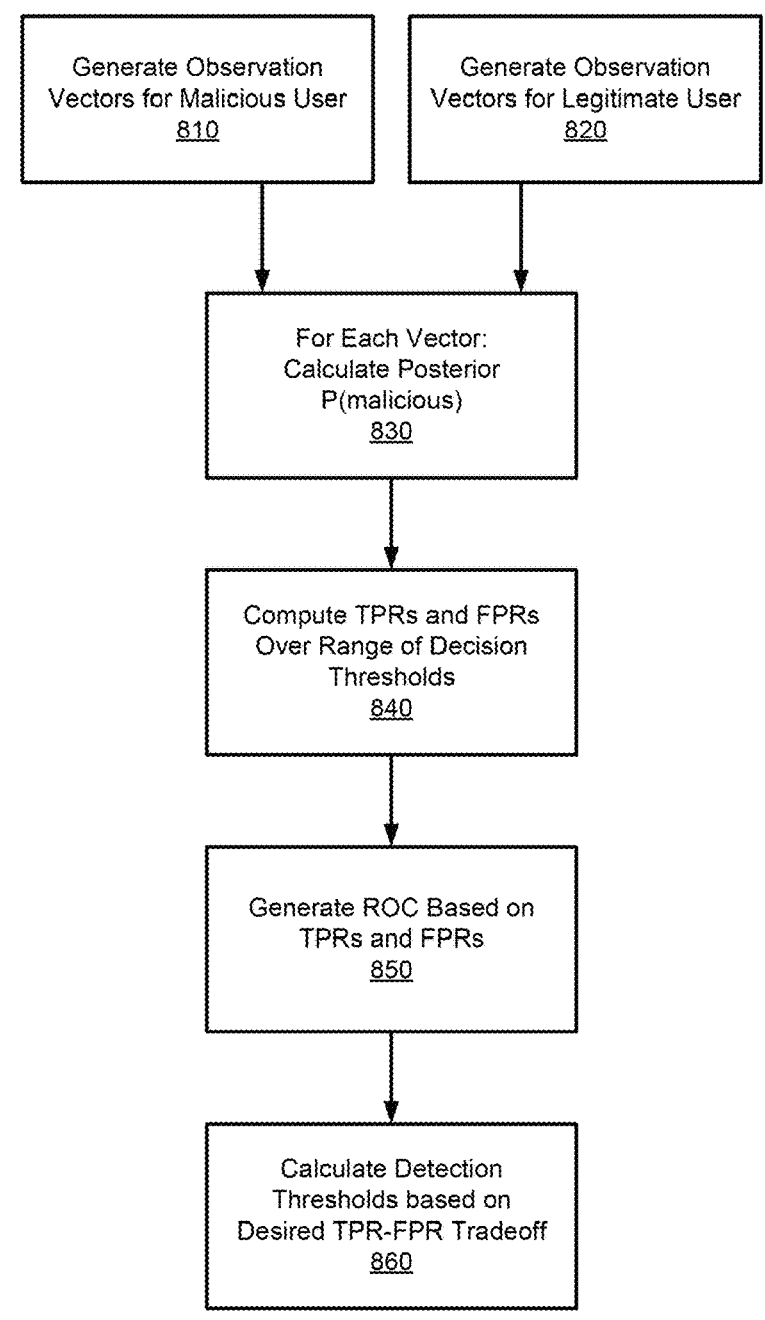
Generate Observation
Vectors for Malicious User
810
Generate Observation
Vectors for Legitimate User
820
For Each Vector:
Calculate Posterior
P(malicious)
830
Compute TPRs and FPRs
Over Range of Decision
Thresholds
840
Generate ROC Based on
TPRs and FPRs
850
Calculate Detection
Thresholds based on
Desired TPR-FPR Tradeoff
860
FIG. 8

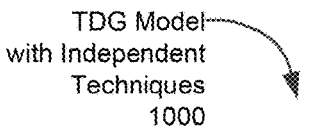
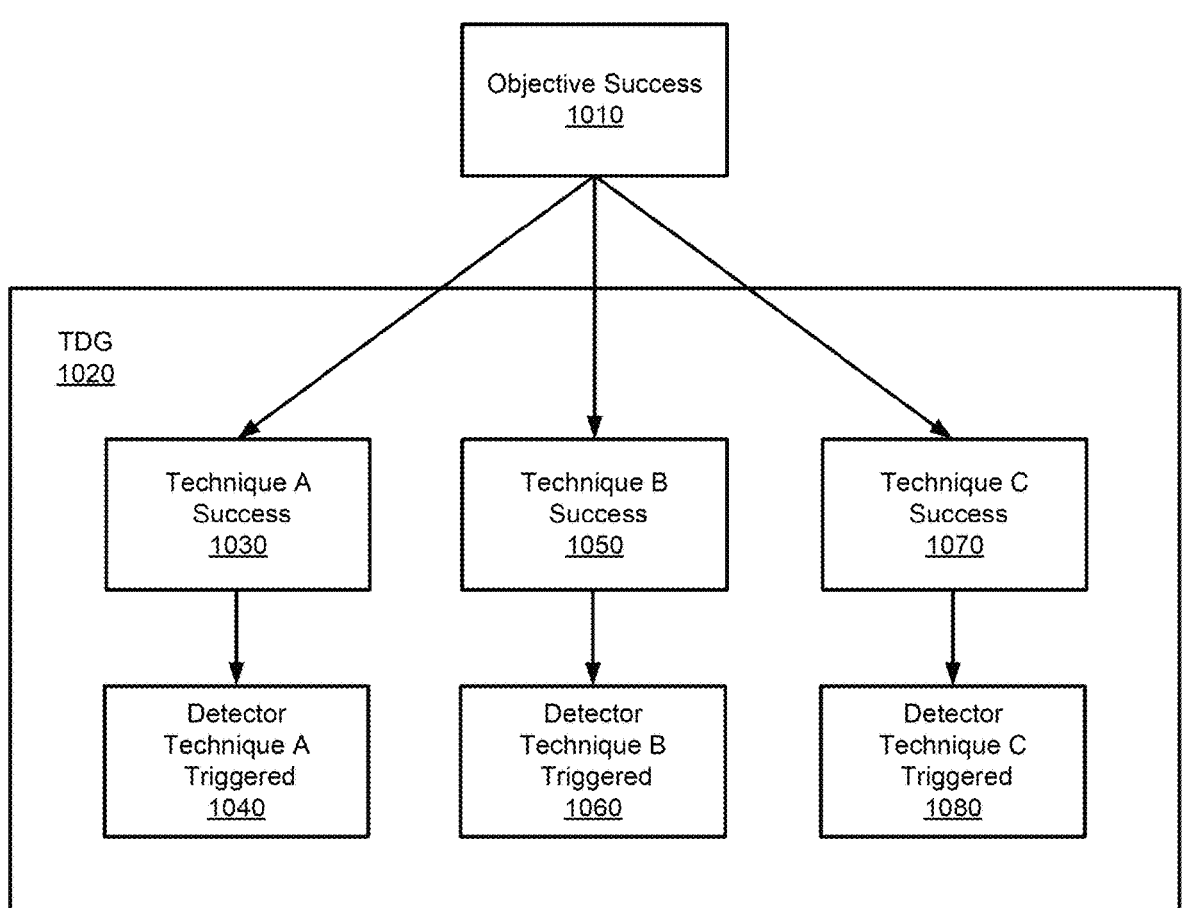
FIG. 10

TDG Model
with One Technique
1100

Objective Success
1110

TDG
1120

Success for
One Technique
1115

Technique A
Success
1130

Technique B
Success
1150

Technique C
Success
1170

Detector
Technique A
Triggered
1140

Detector
Technique B
Triggered
1160

Detector
Technique C
Triggered
1180

TDG Model
for Probability of
Number of Techniques
1200

Objective Success
1210

TDG
1220

Number of
Appearing
Techniques
1215

Technique A
Success
1230

Technique B
Success
1250

Technique C
Success
1270

Detector
Technique A
Triggered
1240

Detector
Technique B
Triggered
1260

Detector
Technique C
Triggered
1280

Example CPTs
1300

Objective CPT
1310

Persistence Success
1320

|  |  | FALSE | TRUE |
|---|---|---|---|
| Execution Success 1330 | FALSE | 1.0 | 0.0 |
|  | TRUE | 0.8 | 0.2 |

Technique CPT
1340

Detector A Triggered
1350

|  |  | FALSE | TRUE |
|---|---|---|---|
| Technique A Success 1360 | FALSE | 0.95 (specificity) | 0.05 (false positive rate) |
|  | TRUE | 0.1 (false negative rate) | 0.9 (sensitivity) |

Receiver Operating Curve
1400

True Positive
Rate
1410

1.0

B
1440

0.8

0.6

A
1430

0.4

0.2

0.0

0.0          0.2          0.4          0.6          0.8          1.0

False Positive Rate
1420

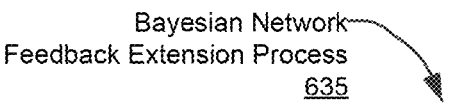

Bayesian Network
Feedback Extension Process
635

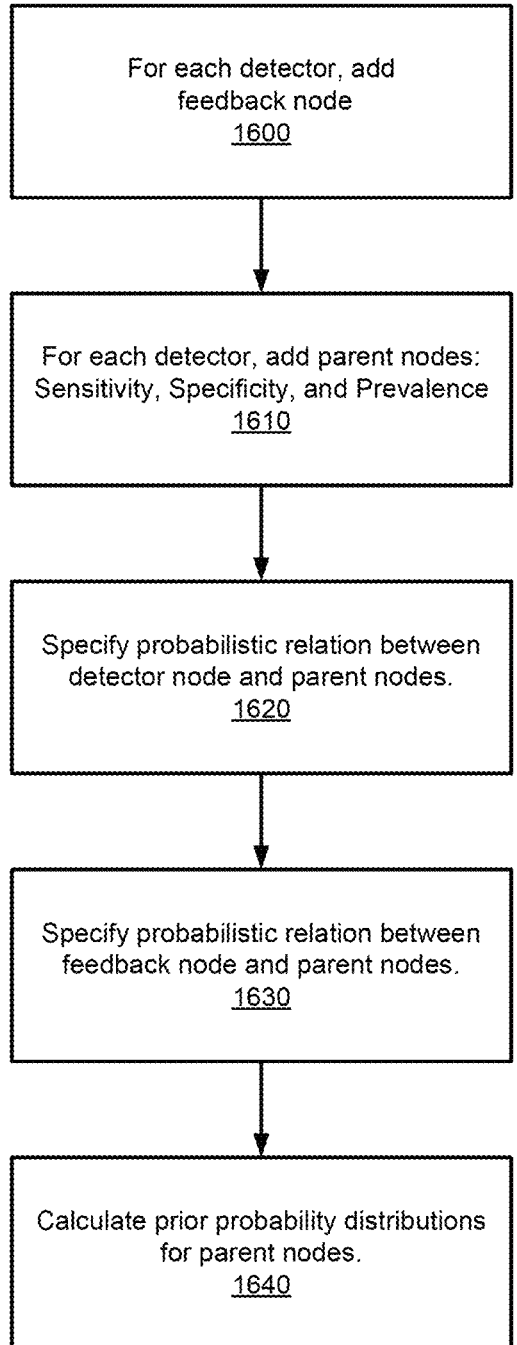

For each detector, add
feedback node
1600

For each detector, add parent nodes:
Sensitivity, Specificity, and Prevalence
1610

Specify probabilistic relation between
detector node and parent nodes.
1620

Specify probabilistic relation between
feedback node and parent nodes.
1630

Calculate prior probability distributions
for parent nodes.
1640

FIG. 16

SYSTEM AND METHOD FOR COMBINING CYBER-SECURITY THREAT DETECTIONS AND ADMINISTRATOR FEEDBACK

CROSS-REFERENCE TO RELATED APPLICATIONS

This application claims priority under 35 U.S.C. § 120 as a continuation of PCT Application No. PCT/GR2022/000050, titled "SYSTEM AND METHOD FOR COMBINING CYBER-SECURITY THREAT DETECTIONS AND ADMINISTRATOR FEEDBACK" and filed Sep. 27, 2022, which claims priority as a continuation-in-part of U.S. application Ser. No. 17/868,378, titled "SYSTEM AND METHOD FOR COMBINING CYBER-SECURITY THREAT DETECTIONS" and filed Jul. 19, 2022, which claims priority under 35 U.S.C. § 120 as a continuation of PCT Application No. PCT/GR2022/000033, titled "SYSTEM AND METHOD FOR COMBINING CYBER-SECURITY THREAT DETECTIONS" and filed Jun. 30, 2022, each of which is hereby incorporated herein by reference in its entirety.

BACKGROUND

Cybersecurity is an issue of great importance, as attacks on computer systems and the users of those systems continue to increase. There are many types of cyberattacks and threats, which can employ any of a large variety of different techniques. Existing security monitoring tools often struggle to cope with the large and increasing number of threats. Threat detection is a complex and difficult task which can result in either a high false alarm rate or a poor detection rate.

SUMMARY

In at least one example, a computer system is provided. The computer system includes a memory; and at least one processor coupled to the memory and configured to: detect triggering of one or more threat detectors; activate a subset of nodes from a plurality of nodes in a Bayesian network in response to the detection, the activated subset of nodes associated with the triggered threat detectors; determine that feedback associated with the triggered threat detectors is available; accumulate the feedback to a feedback node of the Bayesian network in response to the determination, the feedback node associated with the triggered threat detectors; calculate a probability of malicious action using the Bayesian network to combine probabilities associated with the activated subset of nodes and the feedback node; and perform a security action in response to the probability exceeding a threshold value.

At least some examples of the computer system can include one or more of the following features. The feedback is a binary value indicating one of a positive feedback of performance of the triggered threat detector or a negative feedback of performance of the triggered threat detector, and the feedback node of the Bayesian network is configured to count a number of positive feedbacks provided for the triggered threat detector. The feedback node of the Bayesian network is associated with a feedback random variable that is conditioned on a sensitivity of the triggered threat detector, a specificity of the triggered threat detector, and a prevalence of a threat technique associated with the triggered threat detector. The feedback random variable is modelled as a Binomial probability distribution. Each node of the plurality of nodes of the Bayesian network is configured to provide a probability of detection and a probability of false alarm of a threat associated with the each node. The each node is associated with a threat objective and with one or more threat techniques, the threat techniques associated with the threat objective and with one of the threat detectors. The feedback is provided by a security administrator.

In at least one example, a method for combining threat detections is provided. The method includes: detecting, by a computer system, triggering of one or more threat detectors; activating, by the computer system, a subset of nodes from a plurality of nodes in a Bayesian network in response to the detection, the activated subset of nodes associated with the triggered threat detectors; determining, by the computer system, that feedback associated with the triggered threat detectors is available; accumulating, by the computer system, the feedback to a feedback node of the Bayesian network in response to the determination, the feedback node associated with the triggered threat detectors; calculating, by the computer system, a probability of malicious action using the Bayesian network to combine probabilities associated with the activated subset of nodes and the feedback node; and performing, by the computer system, a security action in response to the probability exceeding a threshold value.

At least some examples of the method can include one or more of the following features. The feedback is a binary value indicating one of a positive feedback of performance of the triggered threat detector or a negative feedback of performance of the triggered threat detector, and the feedback node of the Bayesian network is configured to count a number of positive feedbacks provided for the triggered threat detector. The feedback node of the Bayesian network is associated with a feedback random variable that is conditioned on a sensitivity of the triggered threat detector, a specificity of the triggered threat detector, and a prevalence of a threat technique associated with the triggered threat detector. The feedback random variable is modelled as a Binomial probability distribution. Each node of the plurality of nodes of the Bayesian network is configured to provide a probability of detection and a probability of false alarm of a threat associated with the each node. The each node is associated with a threat objective and with one or more threat techniques, the threat techniques associated with the threat objective and with one of the threat detectors. The feedback is provided by a security administrator.

In at least one example a non-transitory computer readable medium storing executable sequences of instructions to combine threat detections, the sequences of instructions comprising instructions to: detect triggering of one or more threat detectors; activate a subset of nodes from a plurality of nodes in a Bayesian network in response to the detection, the activated subset of nodes associated with the triggered threat detectors; determine that feedback associated with the triggered threat detectors is available; accumulate the feedback to a feedback node of the Bayesian network in response to the determination, the feedback node associated with the triggered threat detectors; calculate a probability of malicious action using the Bayesian network to combine probabilities associated with the activated subset of nodes and the feedback node; and perform a security action in response to the probability exceeding a threshold value.

At least some examples of the non-transitory computer readable medium can include one or more of the following features. The feedback is a binary value indicating one of a positive feedback of performance of the triggered threat detector or a negative feedback of performance of the triggered threat detector, and the feedback node of the Bayesian network is configured to count a number of positive feedbacks provided for the triggered threat detector. The feedback node of the Bayesian network is associated with a feedback random variable that is conditioned on a sensitivity of the triggered threat detector, a specificity of the triggered threat detector, and a prevalence of a threat technique associated with the triggered threat detector. The feedback random variable is modelled as a Binomial probability distribution. Each node of the plurality of nodes of the Bayesian network is configured to provide a probability of detection and a probability of false alarm of a threat associated with the each node. The each node is associated with a threat objective and with one or more threat techniques, the threat techniques associated with the threat objective and with one of the threat detectors. The feedback is provided by a security administrator.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIG. 2 is a block diagram of the threat detector integration system, in accordance with an example of the present disclosure.

FIG. 6 is a flow diagram of a process for instantiating a Bayesian network architecture, in accordance with an example of the present disclosure.

FIG. 7 is a flow diagram of a process for calculating conditional probabilities, in accordance with an example of the present disclosure.

FIG. 8 is a flow diagram of a process for calculating detection thresholds, in accordance with an example of the present disclosure.

FIG. 10 is a diagram of a technique detector graph (TDG) model, in accordance with an example of the present disclosure.

FIG. 16 is a flow diagram of a process for extending the Bayesian network architecture to include feedback, in accordance with an example of the present disclosure.

DETAILED DESCRIPTION

As noted previously, cybersecurity is an issue of great importance and monitoring of the many different types of attacks is a difficult and complex task, with existing threat techniques numbering in the thousands or more and growing daily. Threat detectors exist for many types of attack techniques, though not all. Systems that rely solely on existing threat detectors suffer from at least two weaknesses. First, they typically generate many false alarms which can result in alert fatigue for users and administrators which may then allow actual threats to go unchallenged. Second, new attack techniques are constantly being introduced which, having not yet been modelled, can go undetected.

To address these and other problems, and as summarized above, various examples described herein are directed to systems and methods to integrate cyber-security threat detections by collecting the detections, generated over a period of time and based on activity from a relatively large number of users and devices, and probabilistically combining those detections using a Bayesian network model. The Bayesian network model is configured to jointly assess a wide range of factors including: (1) signals from threat detectors related to user actions and/or unusual behaviors; (2) threat intelligence (e.g., metadata) about the users and the internet providers (IP) that they are using; (3) expert knowledge about the structure of an attack and the dependencies between the stages of that structure; and (4) administrator feedback about the performance characteristics of the threat detectors. The disclosed techniques employ the Bayesian network model to combine this information to generate a score that can be used to identify potential threats. In some examples, the score can be compared to one or more thresholds to make decisions about the potential threats and actions to be taken based on a tradeoff between probability of detection and probability of false alarm.

Figure 1:
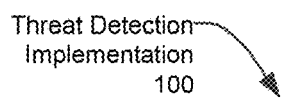
FIG. 1 is a top-level block diagram of an implementation of a system for integrating threat detections, in accordance with an example of the present disclosure.

FIG. 1 is a top-level block diagram of an implementation of a system 100 for integrating threat detections, in accordance with an example of the present disclosure. The system 100 is shown to include a number of users 105, a network 140, and an analytics server 160. In some examples the network 140 may also connect to other servers 180 and the Internet 190. In FIG. 1, users 105*a*-105*n* are associated with (e.g., authenticated to the system 100 via) devices 110*a*-110*n*. Each user 105 is operating a device 110 which may be a laptop, tablet, smartphone, workstation, or any other suitable computing or communication device. The device 110 may include an operating system (OS) 115 and one or more threat detectors 120. The threat detectors 120 may be integrated into the OS 115 and/or they may be applications installed on the device.

The network 140 is configured to connect the devices to the analytics server 160, the other servers 180, and the Internet 190. In some examples, the infrastructure of the network 140 may include additional threat detectors 150 configured to monitor and detect threats in network traffic.

The analytics server 160 is shown to include a threat detector integration system 170. The operation of the threat detector integration system will be described in greater detail below, but at a high level, the system 170 is configured to combine threat detections, provided by the various detectors, with threat intelligence associated with the users and their IPs, along with expert knowledge about the techniques used to carry out the threats, and administrator feedback about the performance characteristics of the threat detectors. The combination is performed in a probabilistic manner using a Bayesian network model. In some examples, the analytics server 160 may be any suitable type of server.

In some examples, the disclosed techniques provide a way to efficiently combine and manage a large quantity of data that may be generated by many threat detectors and many users over a period of time without increasing the false alarm rate or suppressing alerts which would decrease the benefit of employing more detectors. These systems and methods allow for the productive utilization of a large number and variety of detectors configured to catch a wide range of unusual behaviors and suspicious actions of the users.

As will be understood in view of this disclosure, the systems and methods for threat detector integration provided herein have advantages over existing methods which treat each detector alert as an individual event, simply counting the number of occurrences while ignoring the probabilistic nature of the problem. For instance, the systems and methods described herein provide for combining detector results based on the characteristics of each detector and knowledge of how attacks are executed, while also taking into account the experience that administrators (e.g., IT security systems administrators) may have with the performance of the various threat detectors.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Threat Detector Integration System

FIG. 2 is a block diagram of the threat detector integration system 170, in accordance with an example of the present disclosure. The system 170 is shown to include an integrated threat detector 220, a Bayesian network model generator 230, and the Bayesian network model 240.

The operation of the integrated threat detector 220 is described in greater detail below, but at a high level it is configured to collect threat detections 200 and administrator feedback 250 and use the Bayesian network model 240 to calculate a probability of maliciousness (also referred to as a score) for determination of the existence and severity of a possible threat. In some examples, security actions 210 may be performed in response to the determination.

The operation of the Bayesian network model generator 230 is also described in greater detail below, but at a high level it is configured to create and update the Bayesian network model 240 based on information about the detector characteristics, expert knowledge about the threat objectives and techniques, dependencies between the threats and techniques, administrator feedback on threat detector performance, and other relevant data.

For each threat detector 120, 130, etc., the administrator is provided with the opportunity to supply feedback about the detections that the threat detector is producing. This feedback is used to update the knowledge about the performance characteristics of the detectors. This type of knowledge is subsequently used by the Bayesian network in the production of a decision-making score which helps to decide whether there is a malicious threat or if the user is malicious, given the observed values in the output of the detectors. In this way if the administrator, for example, gives mostly negative feedback about the detections produced by detector A, the confidence about the maliciousness of a user when detector A is triggered will be decreased.

Figure 9:
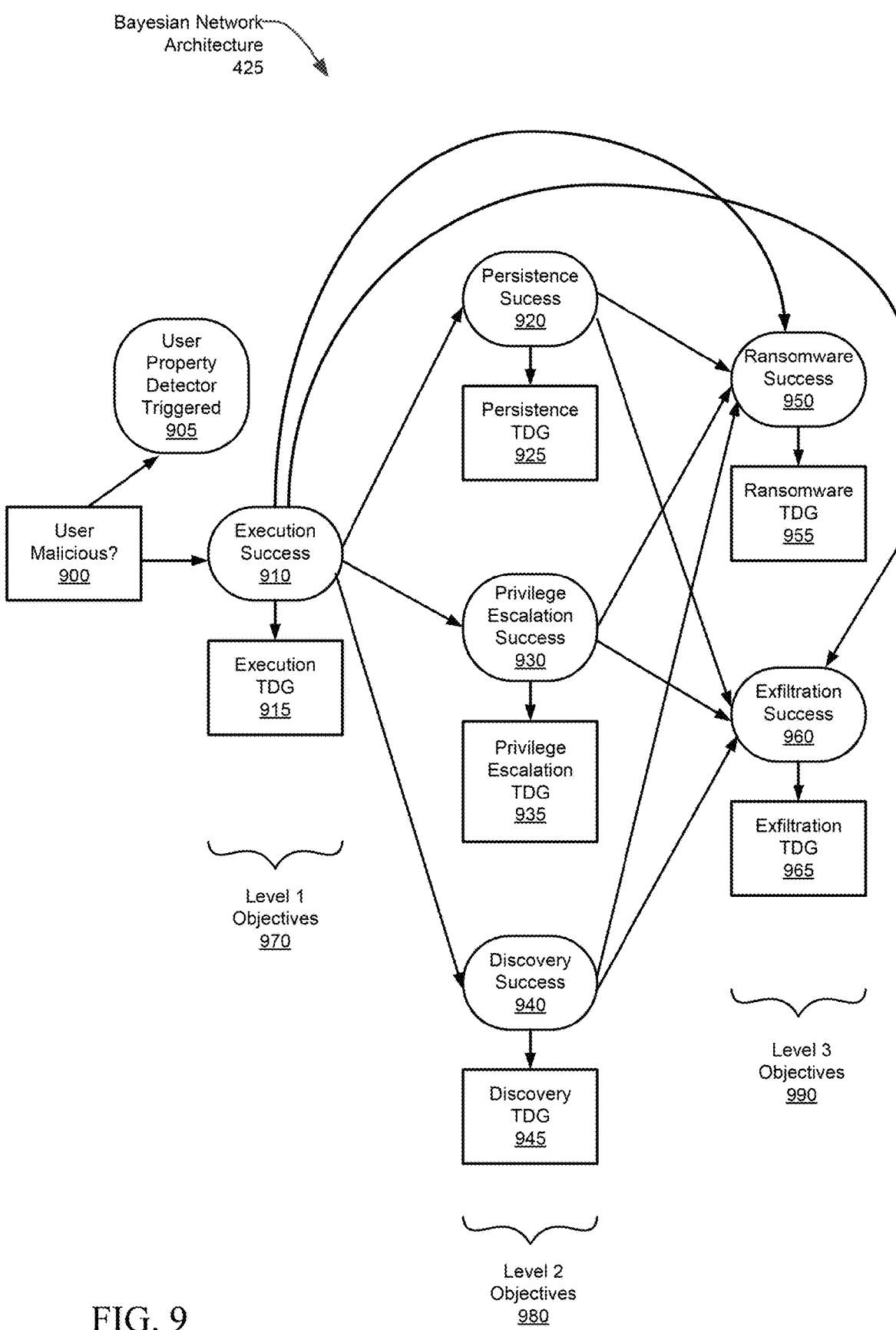
FIG. 9 is a diagram of a Bayesian network architecture, in accordance with an example of the present disclosure.

The Bayesian network model 240 is configured to store the probabilistic information associated with the user and the known threats in the form of a network (e.g., a graph of connected nodes) that allows for efficient calculation of the probability of malicious action based on probabilities, conditional probabilities and interdependencies of the nodes. One example of a Bayesian network architecture is illustrated in FIG. 9 and will be described in greater detail below.

Figure 3:
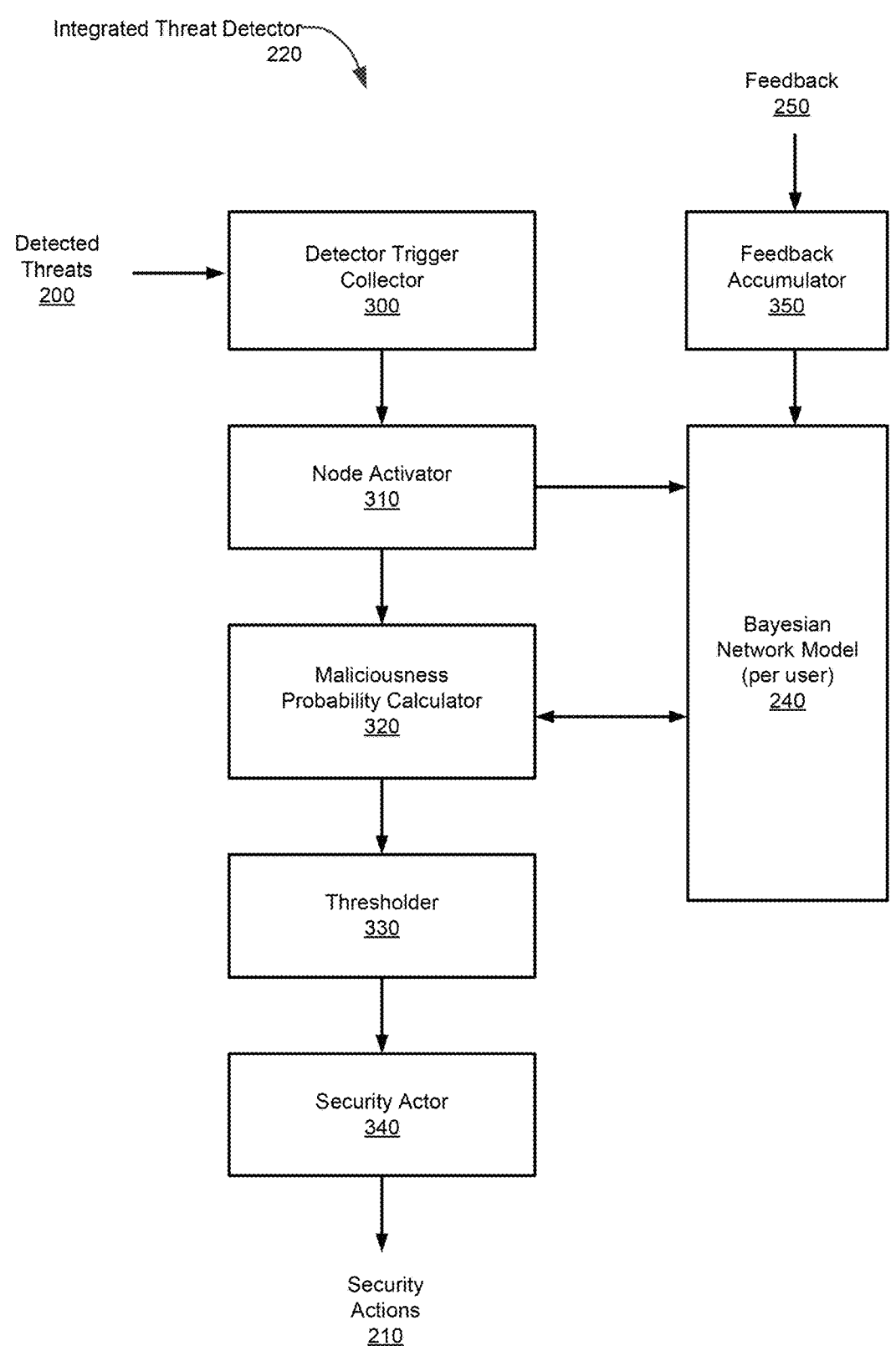
FIG. 3 is a block diagram of an integrated threat detector, in accordance with an example of the present disclosure.

FIG. 3 is a block diagram of the integrated threat detector 220, in accordance with an example of the present disclosure. The integrated threat detector 220 is shown to include a detector trigger collector 300, a node activator 310, a maliciousness probability calculator 320, a thresholder 330, a security actor 340, and a feedback accumulator 350.

The detector trigger collector 300 is configured to detect the triggering 200 of one or more threat detectors, from user devices, the network, or any other source where a threat detector may be employed. For example, threat detectors may communicate detected threats as messages transmitted over the network or through an application programming interface (API). The node activator 310 is configured to activate nodes in the Bayesian network based on the triggered detectors. The nodes to be activated are associated with the threats corresponding to the triggered detectors.

The maliciousness probability calculator 320 is configured to calculate a probability of malicious action (e.g., a score) using the Bayesian network to combine probabilities associated with the activated nodes. In some examples, the calculation may be performed using techniques provided in the pyAgrum library, or using other suitable techniques in light of the present disclosure.

The thresholder 330 is configured to determine whether the score exceeds a selected threshold value to indicate that a malicious threat has been detected. In some examples, the thresholder 330 may determine that the score lies within one or more ranges delimited by a plurality of threshold values, where each range is associated with different levels of confidence that a malicious threat has been detected.

The security actor 340 is configured to perform one or more security actions 210 based on the determination of the thresholder 330. Security actions may include, for example, notifying the user or an administrator, logging the event, and/or taking actions to prevent the malicious threat from achieving a threat objective or causing additional damage.

The feedback accumulator 350 is configured to accumulate administrator feedback 250 on threat detector performance for incorporation into the Bayesian network model 240, as will be described in greater detail below in connection with FIGS. 15 and 16.

Figure 4:
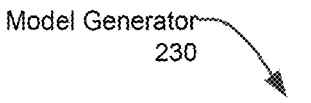
FIG. 4 is a block diagram of a model generator, in accordance with an example of the present disclosure.

FIG. 4 is a block diagram of the Bayesian network model generator 230, in accordance with an example of the present disclosure. The model generator 230 is configured to create and update the Bayesian network model 240, as information about users and threats becomes available or changes. The model generator 230 is shown to include a Bayesian network architecture instantiator 420, a CPT calculator 450, and a detection thresholds calculator 460.

The Bayesian network architecture instantiator 420 is configured to create and update the network architecture 425, one example of which is illustrated in FIG. 9. The instantiator operates based on user property detectors 400, attack objectives 405, and TDGs 410. The network architecture 425 describes the cybersecurity related properties and activities of users in the environment. Operation of the instantiator 420 and the inputs 400, 405, 410, is described below in connection with FIG. 6.

The CPT calculator 450 is configured to generate the conditional probability tables 455 that are associated with each node in the network, based on expert knowledge 430, attack techniques 435, and normal traffic patterns 440. Operation of the CPT calculator 450 and associated inputs is described below in connection with FIG. 7.

The detection thresholds calculator 460 is configured to calculate threshold values 465 for use by the integrated threat detector 220 of FIG. 3, to generate alerts and categorize users and/or events into different risk levels. Operation of the detection thresholds calculator 460 is described below in connection with FIG. 8. The Bayesian network model 240 comprises the architecture 425, CPTs 455, and thresholds 465.

Threat Detector Integration Process

As described above, some examples of the implementation 100 of FIG. 1 are configured to perform a process for threat detector integration. The processes may be executed on a processor of any suitable type (e.g., processor 1710 of FIG. 17).

Figure 5:
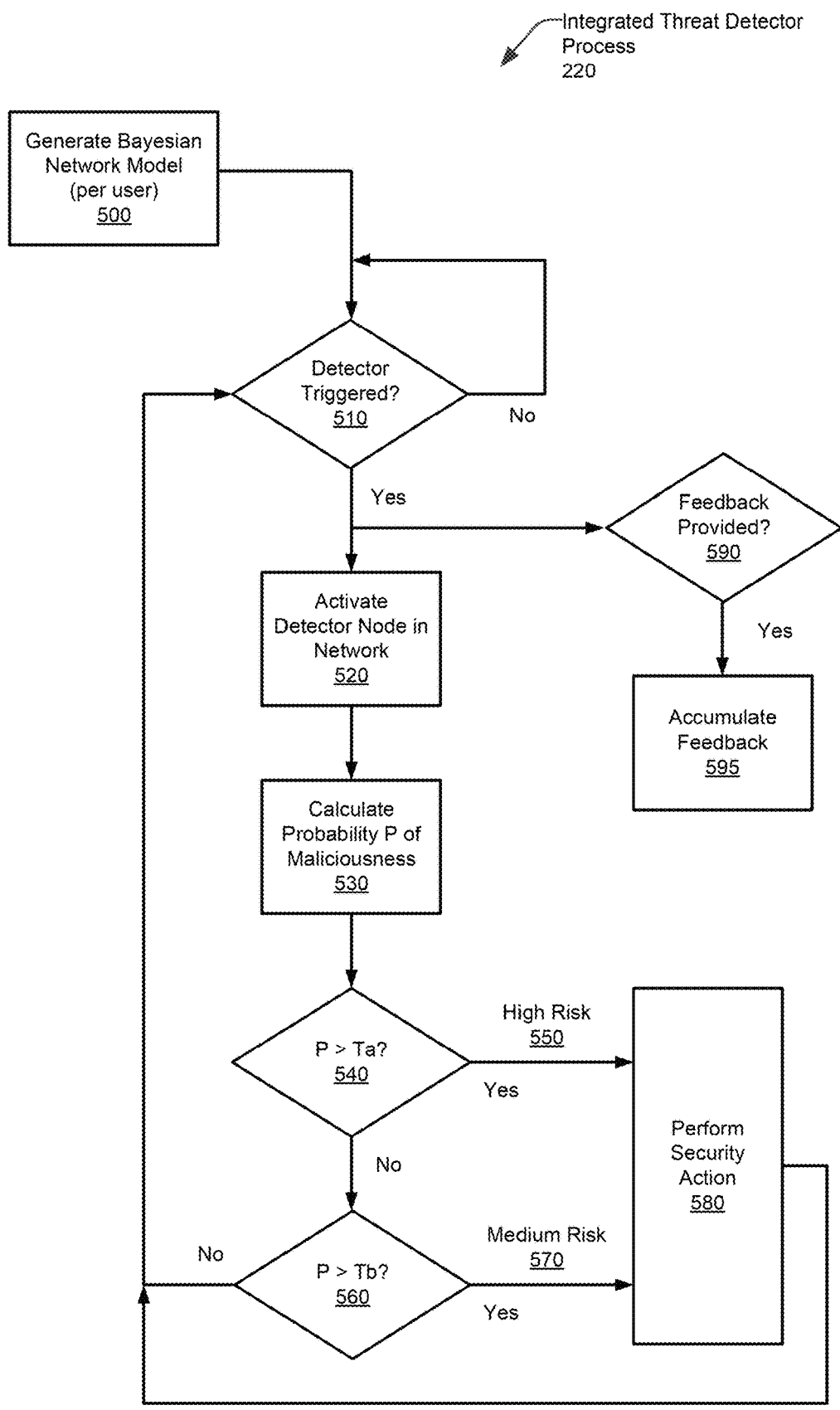
FIG. 5 is a flow diagram of a process for integrating threat detections, in accordance with an example of the present disclosure.

FIG. 5 is a flow diagram of a process for integrating threat detections, executed by the integrated threat detector 220, or the sub-components thereof, in accordance with an example of the present disclosure.

At operation 500, a Bayesian network model, is generated for each user 105. The network generation process is described below in connection with FIGS. 6-8.

Next, at operation 510, the process loops until a threat detector is triggered.

If a threat detector is triggered, then at operation 590, a check is performed as to whether administrator feedback has been provided for that threat detector. If so, then at operation 595, the feedback is accumulated for incorporation into feedback nodes of the Bayesian network for all users, as will be described in greater detail below in connection with FIGS. 15 and 16.

At operation 520, nodes in the network model 240 which are associated with the triggered detectors are activated.

At operation 530, the probability of maliciousness is calculated using the Bayesian network model 240 to combine probabilities associated with the activated nodes. In some embodiments, the combined probabilities are conditioned on the values of the feedback nodes in the network, as will be explained below. In some examples, the calculation may be performed using techniques provided in the pyAgrum library, or using other suitable techniques in light of the present disclosure.

At operation 540, the calculated probability is compared to a first threshold value, threshold A (Ta), and if the threshold is exceeded then a relatively high risk 550 is determined to exist.

At operation 560, the calculated probability is compared to a second threshold value, threshold B (Tb), and if that threshold is exceeded then a relatively medium risk 570 is determined to exist. Otherwise, the risk is determined to be relatively low, and the process continues to loop back to operation 510. In some examples, additional thresholds may be used to further categorize different levels of risk. In some examples, the threshold values are selected based on a tradeoff between probability of detection and probability of false alarm. In some examples, the selection may be provided by an IT administrator (or other personnel tasked with making risk assessment and risk tolerance decisions) through a user interface (UI) of the analytics server 160.

At operation 580, for the case of high risk or medium risk, an appropriate security action (tailored to the respective risk level) is performed and then the process continues to loop back to operation 510. In some examples, security actions may include one or more of notifying the user or an administrator, logging the event, and/or taking actions to prevent the malicious threat from achieving a threat objective or causing additional damage.

In some examples, the process for integrating threat detections operates over a rolling time window (e.g., a day, a week, etc.) during which threat detectors are monitored and nodes in the network are activated and remain activated for the duration of the time window.

FIG. 6 is a flow diagram of a process for instantiating the Bayesian network architecture, executed by the Bayesian network architecture instantiator 420, or the sub-components thereof, in accordance with an example of the present disclosure.

The process will be described with reference to the diagram, shown in FIG. 9, of a Bayesian network architecture 425, in accordance with an example of the present disclosure. The Bayesian network describes the cybersecurity related activity of a user on a computing environment (e.g., an information technology or IT environment). The network architecture is shown to include a number of nodes.

The user node 900 is associated with a binary random variable that presents the question of whether the user is malicious. The inference about the value of this variable drives the alert generation in the integrated threat detector 220.

The user property detector node 905 is associated with a binary random variable indicating whether a user property based detector is triggered. User property based detectors are configured to decide user maliciousness based on properties of the user such as an unusual or unexpected geolocation or probabilistic threat intelligence such as reputation data of the user's IP (e.g., the user's IP is known to be associated with malicious activity). User property detectors are conditionally independent to the other nodes in the Bayesian network, which is to say that knowledge about the maliciousness of the user is not related to other objectives or activities described by the remaining network nodes.

The remaining circular shaped nodes of FIG. 9 are objective nodes. These nodes are associated with a potential objective of a malicious user. Each of the objective nodes corresponds to a binary random variable associated with the question of whether that objective has been achieved by the user in the environment. The objectives fall into one of three categories: level 1 objectives 970, level 2 objectives 980, and Level 3 objectives 990.

Level 1 objectives 970 include those objectives which are necessary to be achieved as a first step so that a malicious actor can proceed with a higher level objective. Execution success 910, which is running code for a malicious purpose, is the primary level 1 objective in this example.

Level 2 objectives 980 include intermediate objectives which may or may not be achieved by a malicious actor prior to achieving an end goal objective (e.g., a Level 3 objective). Level 2 objectives include persistence success 920 (e.g., establishing a long term presence on a network), privilege escalation success 930, and discovery success 940 (e.g., monitoring and probing), in this example. As the connections in the Bayesian network indicate, Level 2 objectives are modeled to be conditionally independent to each other, given the level 1 Execution objective.

Level 3 objectives 990 are the end goal objectives which may include ransomware success 950 and data exfiltration success 960 (e.g., data theft). Level 3 objectives are connected in the Bayesian Network with Level 1 and Level 2 objectives, indicating that the probability of their appearance in the environment is conditioned on the appearance of the objectives in the previous levels. In some examples, additional objectives may be included.

Additionally, as shown in FIG. 9, each of the objective nodes is associated with a TDG (execution TDG 915, persistence TDG 925, privilege escalation TDG 935, discovery TDG 945, ransomware TDG 955, and exfiltration TDG 965). A TDG is a subgraph which is connected to each objective and includes nodes for the techniques that a malicious actor may use to achieve the objective, and nodes for the detectors of each such technique. These detector nodes (as well as the property nodes) are the nodes in the Bayesian Network which are activated. Depending on the dependencies between the techniques, one of three types of subgraphs may be used, as described below.

For the case of independent techniques, the TDG model 1000, illustrated in FIG. 10, may be used. Here, the TDG subgraph 1020 models the techniques 1030, 1050, and 1070 to be conditionally independent to each other. The probability of each technique (conditioned on the success of the objective 1010) may be provided by expert knowledge (e.g., specified by a security expert), separately for each technique. This model can be used for cases when the appearance of one technique in the environment (e.g., a triggering of technique detector 1040, 1060, or 1080), given the success of the objective 1010, does not provide additional information about the appearance of the other techniques. For example, techniques associated with the discovery objective 940, can be modelled in this way as there are multiple things to be discovered in the environment, so it is reasonable to model the appearance of one discovery technique as not influencing the appearance of another discovery technique.

Figure 11:
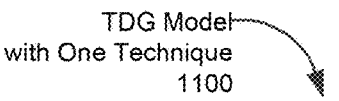
FIG. 11 is a diagram of another TDG model, in accordance with an example of the present disclosure.

For the case where only one technique (or no techniques) can appear, the TDG model 1100, illustrated in FIG. 11, may be used to model the probability of success for the one technique 1115. This is useful for cases where there is no reason to have more than one technique appearing in the environment simultaneously. For example, techniques associated with the privilege escalation objective 930, can be modelled in this way as once the malicious actor has succeeded in escalating their privileges with one technique, there is no reason to try a different technique. Similarly, techniques associated with the ransomware objective 950 can be modelled in this way. Here, the TDG subgraph 1120 models the techniques 1130, 1150, and 1170 to be linked together along with detectors 1140, 1160, and 1180. In this case the probability of seeing one technique in the environment depends on whether the other techniques have been observed, as well as on knowing whether any of the techniques have appeared. This dependency is captured by the fully connected acyclic graph 1100 as shown. For example, the probability of seeing technique C changes depending on whether technique A and technique B are observed, as well as on knowing whether any of the techniques has appeared. This is why technique C has as parents technique A, technique B, and node 1115.

Figure 12:
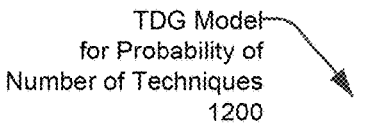
FIG. 12 is a diagram of yet another TDG model, in accordance with an example of the present disclosure.

The TDG model 1200, illustrated in FIG. 12, may be used to describe the case where techniques are equiprobable and the likelihood of the number of techniques appearing together each time 1215 is modelled. This type of modelling is useful for cases when more than one technique may appear together, but the probability of seeing a certain number of techniques together decreases as the number of techniques increases. For example, techniques associated with the execution objective 910, the persistence objective 920, and the exfiltration objective 960 can be modelled in this way. Here, the TDG subgraph 1220 models the techniques 1230, 1250, and 1270 to be linked together along with detectors 1240, 1260, and 1280. In this case the probability of seeing one technique in the environment depends on whether the other techniques have been observed, as well as on knowing how many techniques have appeared in the environment (which is captured by node 1215). This dependency is captured by the fully connected acyclic graph 1200 as shown. For example, the probability of seeing technique C changes depending on whether technique A and technique B are observed, as well as on knowing the number of techniques that have appeared. This is why technique C has as parents technique A, technique B, and node 1215.

Turning now to FIG. 6 and a process 600 illustrated therein for instantiating the Bayesian network architecture, at operation 610, objectives are identified for inclusion in levels 1, 2, or 3 of the network architecture 425, based on whether they are a first step objective, an intermediate objective, or an end goal objective, as described above. These objectives may include the objectives shown in FIG. 9 as well as any other suitable objectives.

At operation 620, for each objective, the associated technique or techniques are identified, for example based on expert knowledge or a database of techniques. Each technique is associated with a detector.

At operation 630, a suitable TDG is chosen for each objective according to the type of dependencies (e.g., independent, one technique, equiprobable techniques) between the techniques associated with the objective, as described above. The TDG of the chosen type is included in the network architecture 425.

At operation 635, the Bayesian network may optionally be extended to provide a capability for incorporating administrator feedback. This process will be described in greater detail below in connection with FIGS. 15 and 16.

At operation 640, user property detectors are identified, for example based on expert knowledge or a database of available detectors, and included in the network architecture 425.

At operation 650, the nodes associated with the user property detectors, the objectives, and the TDGs are connected as illustrated in FIG. 9, and described above.

FIG. 7 is a flow diagram of a process for calculating conditional probabilities, executed by the CPT calculator 450, or the sub-components thereof, in accordance with an example of the present disclosure.

Figure 13:
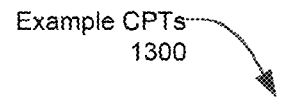
FIG. 13 illustrates conditional probability tables (CPTs), in accordance with an example of the present disclosure.

The process will be described with reference to the example CPTs 1300, shown in FIG. 13, in accordance with an example of the present disclosure. Each node in the network architecture 425 has an associated CPT. The CPTs store the conditional probabilities of the random variables associated with a node, given the values of the random variables associated with one or more parent nodes. For example, an objective CPT 1310 is shown for the persistence objective. The table has true and false entries for persistence success 1320 and the parent execution success 1330. In this example, as shown in the top row, the probability of persistence objective failure given that the parent execution success does not appear is 1.0 (i.e., 100 percent), and consequently the probability of persistence objective success under this condition is 0.0. However, as shown in the bottom row, the probability of persistence objective failure given that execution success does appear is 0.8, and consequently the probability of persistence objective success given this condition is 0.2.

As another example, a technique CPT 1340 is shown for a detector (labeled detector A). The table has true and false entries for detector A triggered 1350 and the parent technique A success 1360. In this example, as shown in the top row, the probability of detector A not being triggered given that parent technique A fails is 0.95. This is referred to as the specificity of the detector. Consequently, the probability of detector A being triggered given that parent technique A fails is 0.05 (e.g., 1–the specificity, also referred to as the false positive rate FPR or false alarm rate). However, as shown in the bottom row, the probability of detector A not being triggered given that parent technique A succeeds is 0.1. This is referred to as the false negative rate of the detector. Consequently, the probability of detector A being triggered given that parent technique A succeeds is 0.9. This referred to as the sensitivity of the detector or probability of detection. The sensitivity is equal to 1–the false negative rate.

The values in the CPTs, for objectives and techniques, may be provided through expert knowledge (e.g., based on the experience of security experts) or through experimentation. In the case of expert knowledge, the expert specifies: (1) the likelihood that one objective appears in the environment given the appearance of the parent objective; and (2) the likelihood that certain techniques associated with the objective appear given that the objective has successfully been achieved in the environment. These probabilities are inherently related to the nature of the problem of combining multiple indicators for threat detection. Some of these probabilities can also be estimated by referencing cybersecurity related knowledge databases that include known procedures of attacks.

In the case of data driven experimentation, these probabilities may be estimated based on data resulting from attacks (usually simulated) and from normal traffic. More specifically, the sensitivity of each detector is estimated using a representative playbook of instances of the corresponding technique and counting the proportion of instances in the playbook which are successfully detected. The specificity of each detector is computed using a representative set of normal traffic examples and counting the proportion of instances which are successfully recognized as normal.

Turning now to FIG. 7 and the process 700 illustrated therein for calculating conditional probabilities, at operation 710, for each objective, the probability of that objective appearing, given the parent objectives, is estimated based on expert knowledge or through experimentation, as described above.

At operation 720, the objective nodes of the CPTs are populated with the objective probabilities provided in the operation 710.

At operation 730, for each technique, the probability of that technique appearing, given the parent nodes, is also estimated based on expert knowledge or through experimentation, as described above.

At operation 740, the probability of a number of appearing techniques is estimated for TDG types 1100 and 1200, given the success of the associated objective, again based on expert knowledge or through experimentation, as described above.

At operation 750, the CPTs of the techniques and the number of appearing techniques in the TDGs are populated with the probabilities estimated in the operations 730 and 740.

At operation 760, the process loops back to operations 710 and 730 for reassessment as needed, as described further below.

At operation 770, the sensitivity of the detectors is calculated based on a playbook of attacks, as described above, or through any other suitable mechanism.

At operation 780, the specificity of the detectors is calculated based on normal traffic, as described above, or through any other suitable mechanism.

At operation 790, the CPTs of the detector nodes are populated with the sensitivity and specificity estimated in the operations 770 and 780.

At operation 795, the process loops back to operation 770 for reassessment as needed, as described below.

The values of the CPTs may be updated (e.g., reassessment) when new knowledge or data is available about the associated probabilities. New knowledge may be available when security experts reassess their beliefs about the dependencies between objectives and techniques in the network. New data may also become available in the form of new examples of attacks or of normal traffic, which can be used to update the sensitivity and specificity estimates of the network detectors. Additionally, when the detectors are updated (e.g., their logic or parameters change to be able to detect new variants of the techniques) their sensitivity and specificity may need to be re-estimated, so the associated CPTs are updated accordingly. When new threat detectors become available (or existing threat detectors are removed, for example through obsolescence or for other reasons), nodes associated with those detectors can be added (or removed) from the network. In some examples, new threat detectors may be provisioned by users (e.g., at the device level) or by IT administrators (e.g., at any level: device, network, server, etc.) as such detectors become available in the market or through internal development by a cyber-security department.

FIG. 8 is a flow diagram of a process for calculating detection thresholds, executed by the detection thresholds calculator 460, or the sub-components thereof, in accordance with an example of the present disclosure.

In some examples, two detection thresholds are calculated, as described below, for subsequent use in the integrated threat detector to generate alerts and categorize users as high, medium, or low risk (although additional thresholds may be employed to expand the number of categories).

Since the Bayesian Network describes the cybersecurity related activity in the IT environment, it can be used to generate examples of detections, which follow the expected distribution in a real environment. At operation 810, a relatively large number N of examples of activity (e.g., N equal 10000 or more) are generated given that a user is malicious (i.e., setting node 900 to one). At operation 820, another N examples of activity are generated given that the user is legitimate (i.e., setting node 900 to zero). Each example is generated by forward sampling the Bayesian network 240 to produce a value for each detector node in the network. Using the values of the detector nodes in each example, an observation vector of length N for a malicious user and an observation vector of length N for a legitimate user is generated, each vector comprising the values for the detector nodes in the network that correspond to one instance of activity.

At operation 830, for each produced observation vector, the Bayesian network is used to compute the posterior probability of the user being malicious (i.e., the posterior probability of the random variable associated with node 900). This posterior probability serves as a decision score for each example of user activity. Each example is labeled with ground truth since it is known whether it corresponds to malicious or legitimate activity (e.g., generated in operation 810 or 820).

At operation 840, a decision threshold is varied across the range of the produced scores of the examples. For each value of the decision threshold, an inference is made for each example as follows. The example is classified as malicious if the score is above the threshold, otherwise it is classified as legitimate. These classifications, based on the score of the model, are compared with the ground truth labels of each example. In this way, a TPR (e.g., sensitivity) and an FPR (e.g., 1−specificity) is computed for each value of the decision threshold.

Figure 14:
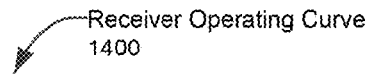
FIG. 14 illustrates a receiver operating curve (ROC), in accordance with an example of the present disclosure.

At operation 850, an ROC curve is generated based on the TPR and FPR. FIG. 14 illustrates an ROC curve 1400, in accordance with an example of the present disclosure. The ROC curve provides a point on the FPR axis 1420 and the TPR axis 1410 for each decision threshold value. The ROC curve illustrates the discriminating capability of the overall decision mechanism of the system. The better the performance of the individual detectors, the closer the area under the ROC curve will be to one (e.g., the curve will have a sharper knee).

At operation 860, two operating points, threshold A 1430 and threshold B 1440 are chosen based on a desired trade-off between sensitivity and specificity of the decision mechanism. In some examples, the trade-off decision may be made by an IT administrator (or other personnel tasked with making risk assessment and risk tolerance decisions), for example, through a UI of the analytics server 160 of FIG. 1. Point A is associated with a low FPR (approximately 0.05 in this example) and therefore a high specificity. Examples with a score higher than threshold A can be classified as relatively high risk (as in operation 540 of FIG. 5), since only a small portion of legitimate examples will fall in this range. Threshold B has a larger FPR (approximately 0.12 in this example) and therefore a medium specificity. Examples with a score falling between threshold A and threshold B (as in operation 560 of FIG. 5), can be classified as medium risk.

All other examples with a score smaller than threshold B can be classified as relatively low risk.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Incorporation of Administrator Feedback into the Bayesian Network

The Bayesian network, as previously described, may be extended to leverage feedback from security administrators who have informed opinions and experience about the performance of the threat detectors. This feedback can be used to improve the overall decision-making process of the Bayesian network.

Figure 15:
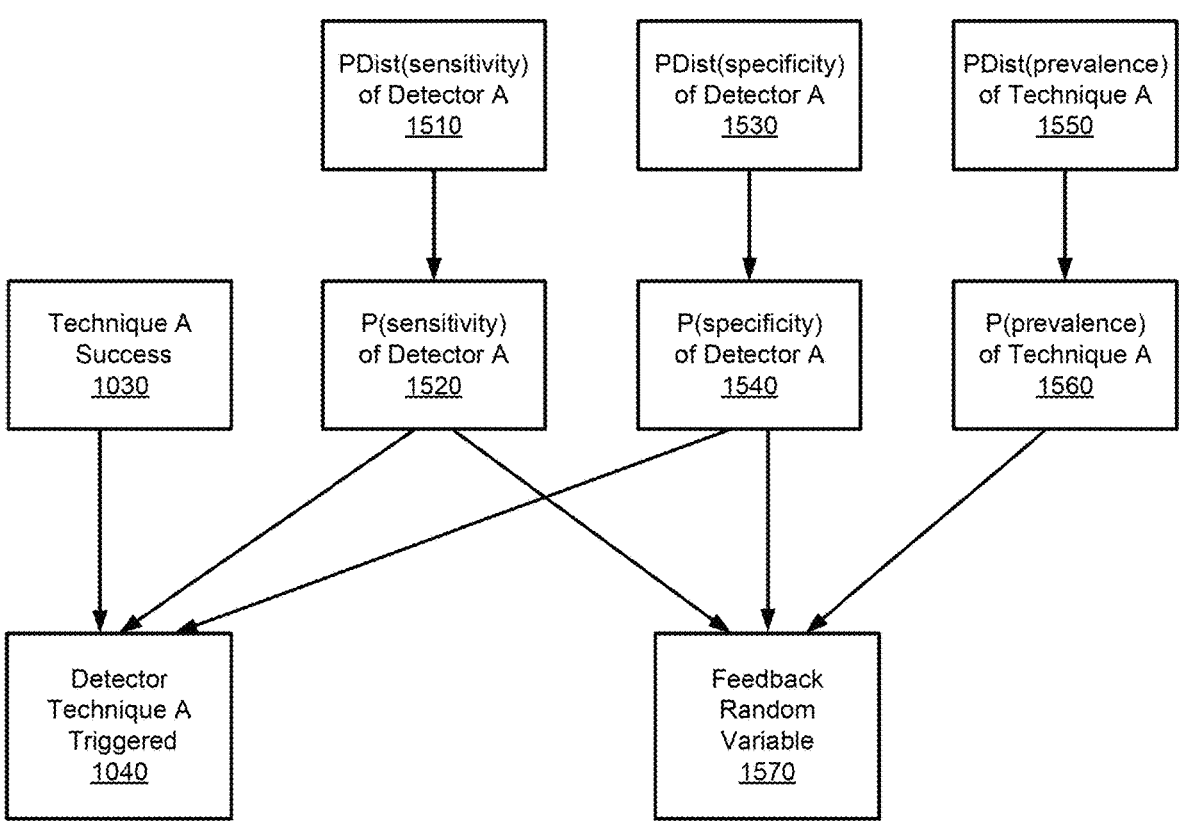
FIG. 15 is a diagram of a TDG model that incorporates feedback, in accordance with an example of the present disclosure.

FIG. 15 is a diagram of a TDG model 1500 that incorporates feedback, in accordance with an example of the present disclosure.

In the previous description of a TDG, for example TDG 1020 of FIG. 10, the relationship between the random variable indicating the appearance of a malicious technique 1030 and the random variable indicating whether the associated threat detector has been triggered 1040, is provided by expert knowledge for each technique (e.g., specified by a security expert). In that relatively simplified case, the sensitivity and specificity of the threat detector are assumed to be known (e.g., deterministic parameters) which define the CPT associated with the two random variables (e.g., 1340 of FIG. 13).

TDG 1500, however, provides a more complex and realistic model in which the sensitivity and specificity of the threat detector are modelled as random variables 1520 and 1540 respectively. At a high level of description, these random variables allow knowledge encoded in the Bayesian network to be dynamically updated as relevant observations about these sensitivity and specificity metrics become available. In TDG 1500, the random variable indicating whether the threat detector has been triggered 1040 is conditioned not only on the success/appearance of the technique 1030, as before, but also on the sensitivity of the detector 1520 and the specificity of the detector 1540. The sensitivity and specificity of the detectors are now handled in a probabilistic manner since their true values cannot be known and confidence in these values can vary from one detector to the next.

Additionally, TDG 1500, includes a feedback random variable 1570 to model the administrator feedback about the performance characteristics of the threat detectors. The feedback random variable 1570 is also conditioned on the detector performance characteristics (e.g., sensitivity 1520 and specificity 1540), however it is also conditioned on the prevalence of the technique, which is modelled by an additional random variable 1560.

TDG 1500 also includes prior probability distributions, 1510, 1530, and 1540 for the detector sensitivity 1520, detector specificity 1540, and technique prevalence 1560, respectively. These prior probability distributions are based on offline evaluations and expert knowledge, as will be described below.

In more detail now, the sensitivity and specificity for each threat detector are included as new nodes (e.g., random variables) 1520 and 1540 in the Bayesian network. The relationship of these two new nodes with the other nodes in the Bayesian network is shown in FIG. 15. More specifically, for each node representing a threat detector in the Bayesian network (in this example the threat detector for technique A), two parent nodes 1520 and 1540 are introduced, representing the sensitivity and the specificity of that detector. The probabilistic relationship between the detector node 1040 and the parent nodes 1520 and 1540 is given by the following equations of conditional probabilities:

$$P(\text{Detector=TRUE}|\text{Technique=TRUE,Sensitivity}=x, \text{Specificity}=y)=x$$

$$P(\text{Detector=TRUE}|\text{Technique=FALSE,Sensitivity}=x, \text{Specificity}=y)=1-y$$

$$P(\text{Detector=FALSE}|\text{Technique=TRUE,Sensitivity}=x, \text{Specificity}=y)=1-x$$

$$P(\text{Detector=FALSE}|\text{Technique=FALSE,Sensitivity}=x, \text{Specificity}=y)=y \qquad \text{(Eq. 1)}$$

where the sensitivity is x and the specificity is y.

Since nodes 1520 and 1540 do not have parents in the Bayesian network, their prior probability distributions, 1510 and 1530, need to be specified. The prior probability distributions describe the available knowledge about the sensitivity and specificity of each detector and are modelled as Beta probability distributions, with parameters a and b, that describe a random variable taking on values between zero and one. The Beta distribution describes the probability distribution of the random variable after observing a−1 successes and b−1 failures. The parameters a and b may be acquired through calibration experiments for each detector. For example, a suitable dataset containing examples of user behaviors is obtained and a count is made of the number of examples that are classified correctly and incorrectly by the associated threat detector.

More specifically, for the Beta distribution 1510 which models the prior of the sensitivity of the detector, a dataset of examples of the malicious technique that the detector should be able to detect is employed to compute the parameters a and b. The examples in the dataset are representative of the variations in the way that a malicious actor can execute the malicious technique (e.g., based on expert knowledge). The threat detector is then applied to these examples, and the values of a and b are computed as the number of examples (increased by one) which have been identified as malicious or not malicious, respectively.

Similarly, for the Beta distribution 1530 which models the prior of the specificity of the detector, a dataset of examples that are representative of normal traffic is employed to compute the parameters a and b. The threat detector is then applied to these examples, and the values of a and b are computed as the number of examples (increased by one) which have been identified as legitimate or not legitimate, respectively.

Turning now to the incorporation of administrator feedback into the Bayesian network, for each threat detector, the administrator is provided with the opportunity to review and evaluate the detections generated by the threat detector. The administrator may then supply feedback based on those evaluations in the form of a binary vote that is either positive or negative for each detection. In this way, a number of positive votes (Npos) and a number of negative votes (Nneg) are provided for each threat detector. It is not necessary for feedback to be provided by the administrator for every generated detection, rather feedback on a random sampling of detections may be sufficient for improved network performance. The value of Npos that is attributed to a detector, when the administrator has voted n times, is an observation of a Binomial random variable with parameters ($p_{prec}$, n), where $p_{prec}$ is related to the performance characteristics of the detector and n=Npos+Nneg. More specifically, $p_{prec}$ is the precision of the detector, which is defined for this purpose, as the frequency with which the detections of the detector are correct.

For each detector in the Bayesian network, the additional feedback random variable 1570 counts the number of total votes and the number of positive votes given to the detector by the administrator. This may be accomplished, for example, by the feedback accumulator 350, of FIG. 3. The feedback random variable node 1570 has as parents the random variables associated with the sensitivity 1520 and the specificity 1540 of the detector, as well as the prevalence random variable 1560 which represents the prevalence of the malicious technique that the detector aims to detect. These random variables and the related connections are shown in FIG. 15.

The probabilistic relation between the feedback random variable 1570 and its parents 1520, 1540, and 1560, when the administrator has voted n times, is given by the following Equation:

$$P(N\text{pos}=a|\text{Sensitivity}=x,\text{Specificity}=y,\text{Prevalence}=z)= \binom{n}{a}p_{prec}{}^{a}(1-p_{prec})^{n-a} \qquad \text{(Eq. 2)}$$

where:

$$p_{prec} = \frac{x \cdot z}{x \cdot z + (1 - y)(1 - z)}$$

Since the prevalence random variable node 1560 does not have parent nodes in the Bayesian network, its prior probability distribution 1550 needs to be specified. This probability distribution describes the available knowledge (e.g., expert knowledge) about the prevalence of the technique, and is also modelled as a Beta probability distribution. The parameters a and b of the prevalence Beta distribution are chosen, based on expert knowledge, according to the number of times that the malicious technique is expected to appear in a set of instances of user behaviors of size a+b.

FIG. 16 is a more detailed flow diagram of the process 635 for extending the Bayesian network architecture to include feedback, in accordance with an example of the present disclosure. At operation 1600, a feedback node 1570 is added for each threat detector in the Bayesian network. At operation 1610, parent nodes for detector sensitivity 1520, detector specificity 1540, and threat prevalence 1560 are added for each threat detector in the Bayesian network.

At operation 1620, the probabilistic relation between the detector node 1040 and the parent nodes 1520 and 1540, as described above in equation 2, is provided or otherwise programmed into the Bayesian network.

At operation 1630, the probabilistic relation between the feedback node 1570 and the parent nodes 1520, 1540 and 1560, as described above in equation 2, is provided or otherwise programmed into the Bayesian network.

At operation 1640, the prior probability distributions 1510, 1530, and 1550 are calculated for the parent nodes sensitivity 1520, specificity 1540, and prevalence 1560, respectively, using Beta distributions as described above.

Computing Platform for Threat Detector Integration

Figure 17:
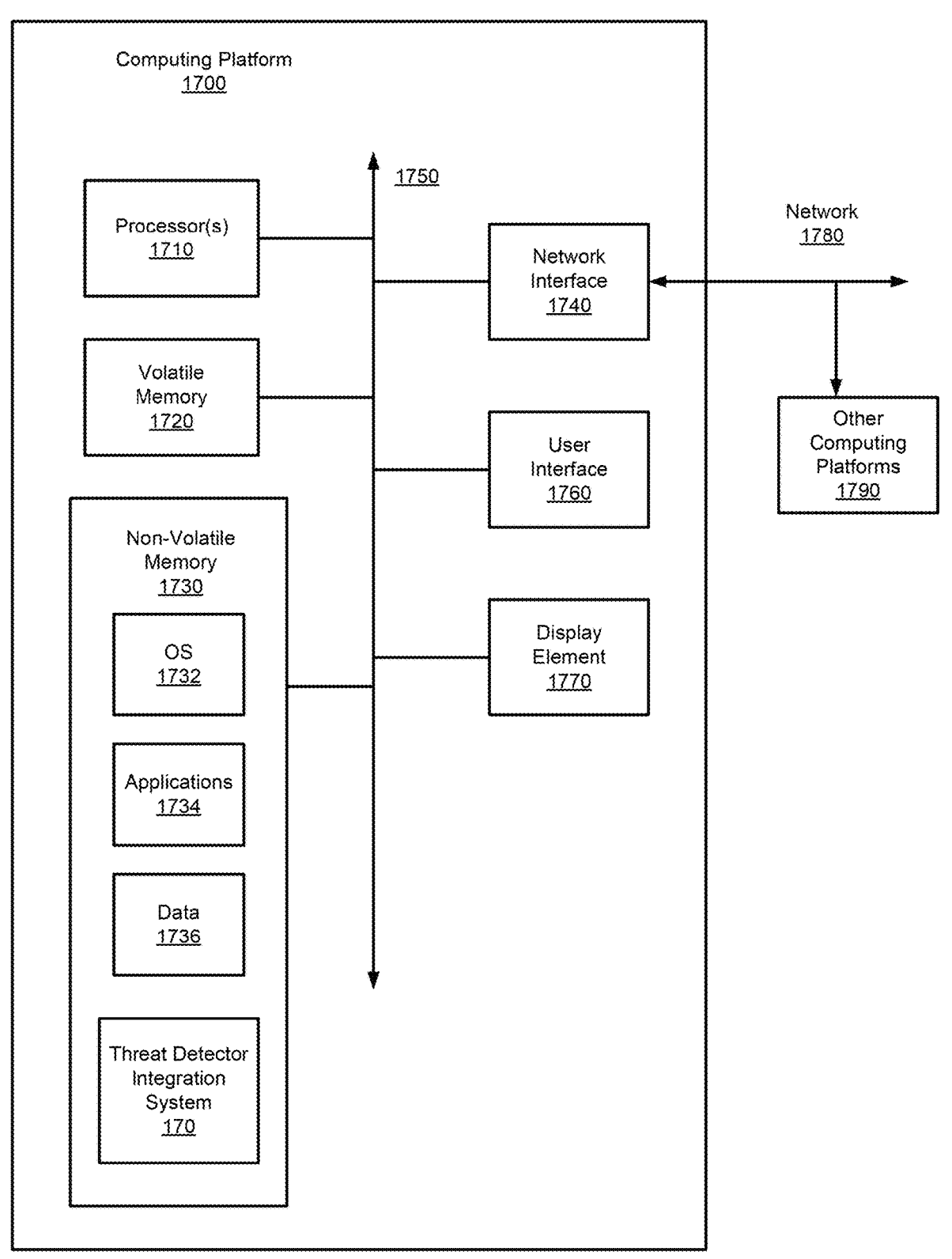
FIG. 17 is a block diagram of a computing platform configured to perform threat detector integration, in accordance with an example of the present disclosure.

FIG. 17 is a block diagram of a computing platform 1700 configured to perform threat detector integration, in accordance with an example of the present disclosure. In some cases, the platform 1700 is the analytic server 160, of FIG. 1, which may be a workstation, server, laptop or other suitable computing device.

The computing platform 1700 includes one or more processors 1710, volatile memory 1720 (e.g., random access memory (RAM)), non-volatile memory 1730, one or more network or communication interfaces 1740, UI 1760, display element (e.g., screen) 1770, and a communications bus 1750. The computing platform 1700 may also be referred to as a computer or a computer system.

The non-volatile (non-transitory) memory 1730 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1760 can include one or more input/output (I/O) devices (e.g., a mouse, a keyboard, a microphone, one or more speakers, one or more biometric scanners, one or more environmental sensors, and one or more accelerometers, etc.).

The display element 1770, can provide a graphical user interface (GUI) and in some cases, may be a touchscreen or any other suitable display device.

The non-volatile memory 1730 stores an operating system 1732, one or more applications 1734, and data 1736. The applications may include the threat detector integration system 170 such that, for example, computer instructions of the operating system 1732 and applications 1734 are executed by processor(s) 1710 out of the volatile memory 1720. In some examples, the volatile memory 1720 can include one or more types of RAM and/or a cache memory that can offer a faster response time than a main memory. Data can be entered through the user interface 1760. Various elements of the computer 1700 can communicate via the communications bus 1750.

The illustrated computing platform 1700 is shown merely as an example client device or server and can be implemented by any computing or processing environment with any type of machine or set of machines that can have suitable hardware and/or software capable of operating as described herein.

The processor(s) 1710 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1710 can be analog, digital, or mixed. In some examples, the processor 1710 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 1740 can include one or more interfaces to enable the computing platform 1700 to access a computer network 1780 such as a Local Area Network (LAN), a Wide Area Network (WAN), a Personal Area Network (PAN), or the Internet through a variety of wired and/or wireless connections, including cellular connections. In some examples, the network 1780 may allow for communication with other computing platforms 1790, to enable distributed computing.

In described examples, the computing platform 1700 can execute an application on behalf of a user of the client device. For example, the computing platform 1700 can execute one or more virtual machines managed by a hypervisor. Each virtual machine can provide an execution session within which applications execute on behalf of a user or a client device, such as a hosted desktop session. The computing platform 1700 can also execute a terminal services session to provide a hosted desktop environment. The computing platform 1700 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:

a memory; and at least one processor coupled to the memory and configured to:

detect triggering of one or more threat detectors;

activate a subset of nodes from a plurality of nodes in a Bayesian network in response to the detection, the activated subset of nodes associated with the triggered threat detectors;

determine that feedback associated with the triggered threat detectors is available;

accumulate the feedback to a feedback node of the Bayesian network in response to the determination, the feedback node associated with the triggered threat detectors;

calculate a probability of malicious action using the Bayesian network to combine probabilities associated with the activated subset of nodes and the feedback node; and perform a security action in response to the probability exceeding a threshold value.

2. The computer system of claim 1, wherein the feedback is a binary value indicating one of a positive feedback of performance of the triggered threat detector or a negative feedback of performance of the triggered threat detector, and the feedback node of the Bayesian network is configured to count a number of positive feedbacks provided for the triggered threat detector.

3. The computer system of claim 1, wherein the feedback node of the Bayesian network is associated with a feedback random variable that is conditioned on a sensitivity of the triggered threat detector, a specificity of the triggered threat detector, and a prevalence of a threat technique associated with the triggered threat detector.

4. The computer system of claim 3, wherein the feedback random variable is modelled as a Binomial probability distribution.

5. The computer system of claim 1, wherein each node of the plurality of nodes of the Bayesian network is configured to provide a probability of detection and a probability of false alarm of a threat associated with the each node.

6. The computer system of claim 5, wherein the each node is associated with a threat objective and with one or more threat techniques, the threat techniques associated with the threat objective and with one of the threat detectors.

7. The computer system of claim 1, wherein the feedback is provided by a security administrator.

8. A method for combining threat detections:

detecting, by a computer system, triggering of one or more threat detectors;

activating, by the computer system, a subset of nodes from a plurality of nodes in a Bayesian network in response to the detection, the activated subset of nodes associated with the triggered threat detectors;

determining, by the computer system, that feedback associated with the triggered threat detectors is available;

accumulating, by the computer system, the feedback to a feedback node of the Bayesian network in response to the determination, the feedback node associated with the triggered threat detectors;

calculating, by the computer system, a probability of malicious action using the Bayesian network to combine probabilities associated with the activated subset of nodes and the feedback node; and performing, by the computer system, a security action in response to the probability exceeding a threshold value.

9. The method of claim 8, wherein the feedback is a binary value indicating one of a positive feedback of performance of the triggered threat detector or a negative feedback of performance of the triggered threat detector, and the feedback node of the Bayesian network is configured to count a number of positive feedbacks provided for the triggered threat detector.

10. The method of claim 8, wherein the feedback node of the Bayesian network is associated with a feedback random variable that is conditioned on a sensitivity of the triggered threat detector, a specificity of the triggered threat detector, and a prevalence of a threat technique associated with the triggered threat detector.

11. The method of claim 10, wherein the feedback random variable is modelled as a Binomial probability distribution.

12. The method of claim 8, wherein each node of the plurality of nodes of the Bayesian network is configured to provide a probability of detection and a probability of false alarm of a threat associated with the each node.

13. The method of claim 12, wherein the each node is associated with a threat objective and with one or more threat techniques, the threat techniques associated with the threat objective and with one of the threat detectors.

14. The method of claim 8, wherein the feedback is provided by a security administrator.

15. A non-transitory computer readable medium storing executable sequences of instructions to combine threat detections, the sequences of instructions comprising instructions to:

detect triggering of one or more threat detectors;

activate a subset of nodes from a plurality of nodes in a Bayesian network in response to the detection, the activated subset of nodes associated with the triggered threat detectors;

determine that feedback associated with the triggered threat detectors is available;

accumulate the feedback to a feedback node of the Bayesian network in response to the determination, the feedback node associated with the triggered threat detectors;

calculate a probability of malicious action using the Bayesian network to combine probabilities associated with the activated subset of nodes and the feedback node; and perform a security action in response to the probability exceeding a threshold value.

16. The computer readable medium of claim 15, wherein the feedback is a binary value indicating one of a positive feedback of performance of the triggered threat detector or a negative feedback of performance of the triggered threat detector, and the feedback node of the Bayesian network is configured to count a number of positive feedbacks provided for the triggered threat detector.

17. The computer readable medium of claim 15, wherein the feedback node of the Bayesian network is associated with a feedback random variable that is conditioned on a sensitivity of the triggered threat detector, a specificity of the triggered threat detector, and a prevalence of a threat technique associated with the triggered threat detector.

18. The computer readable medium of claim 17, wherein the feedback random variable is modelled as a Binomial probability distribution.

19. The computer readable medium of claim 15, wherein each node of the plurality of nodes of the Bayesian network is configured to provide a probability of detection and a probability of false alarm of a threat associated with the each node.

20. The computer readable medium of claim 19, wherein the each node is associated with a threat objective and with one or more threat techniques, the threat techniques associated with the threat objective and with one of the threat detectors.

21. The computer readable medium of claim 15, wherein the feedback is provided by a security administrator.

* * * * *